(12) United States Patent
Itabashi (10) Patent No.: US 6,847,474 B2
(45) Date of Patent: Jan. 25, 2005

(54) OPTICAL SCANNING DEVICE, SCANNING OPTICAL SYSTEM, SCANNING IMAGING OPTICAL COMPONENT, OPTICAL SCANNING METHOD, GHOST IMAGE PREVENTING METHOD AND IMAGE FORMING APPARATUS

(75) Inventor: Akihisa Itabashi, Tokyo (JP)

(73) Assignee: Ricoh Company, Limited., Tokyo (JP)

( * ) Notice: Subject to any disclaimer, the term of this patent is extended or adjusted under 35 U.S.C. 154(b) by 0 days.

(21) Appl. No.: 10/460,181

(22) Filed: Jun. 13, 2003

(65) Prior Publication Data

US 2003/0206323 A1 Nov. 6, 2003

Related U.S. Application Data

(62) Division of application No. 09/810,184, filed on Mar. 19, 2001.

(30) Foreign Application Priority Data

Mar. 22, 2000 (JP) ........................................ 2000-080521

(51) Int. Cl.[7] ............................................. G02B 26/08
(52) U.S. Cl. ........................ 359/205; 359/217; 347/263
(58) Field of Search ................................. 359/205, 206, 359/207, 212, 216, 217, 218, 219; 347/256, 257, 258, 259, 263

(56) References Cited

U.S. PATENT DOCUMENTS

| | | | | | |
|---|---|---|---|---|---|
| 4,863,227 A | * | 9/1989 | Takanashi | ................... | 359/207 |
| 4,930,869 A | * | 6/1990 | Miyagawa et al. | .......... | 359/205 |
| 5,903,379 A | * | 5/1999 | Kamikubo | ................... | 359/212 |
| 6,400,488 B1 | * | 6/2002 | Nagasaka et al. | ........... | 359/212 |

* cited by examiner

Primary Examiner—Mark A. Robinson
(74) Attorney, Agent, or Firm—Oblon, Spivak, McClelland, Maier & Neustadt, P.C.

(57) ABSTRACT

A scanning imaging optical component is used in an optical scanning device which deflects a beam from a light source by a light deflector, condenses the deflected beam toward a surface to be scanned by a scanning imaging optical system, forms a beam spot on the surface to be scanned, and performs optical scanning of the surface to be scanned. The optical component forms at least a part of the scanning imaging optical system, and at least a part of a surface of the optical component other than an effective optical surface is made to be a roughened surface, and roughness thereof is such that: Rmax>0.5 ($\mu$m).

15 Claims, 7 Drawing Sheets

OPTICAL SCANNING DEVICE, SCANNING OPTICAL SYSTEM, SCANNING IMAGING OPTICAL COMPONENT, OPTICAL SCANNING METHOD, GHOST IMAGE PREVENTING METHOD AND IMAGE FORMING APPARATUS

CROSS-REFERENCE TO RELATED APPLICATION

This application is a Divisional of co-pending U.S. patent application Ser. No. 09/810,184 filed Mar. 19, 2001, and claims priority to Japanese Patent Application No. 2000-080521, filed Mar. 22, 2000. The contents of these applications are incorporated herein by reference in their entirety.

BACKGROUND OF THE INVENTION

1. Field of the Invention

The present invention relates to an optical scanning device, a scanning optical system, a scanning imaging optical component, an optical scanning method, a ghost image preventing method and an image forming apparatus.

2. Description of the Related Art

An optical scanning device which deflects a beam from a light source by a light deflector, condenses the deflected beam toward a surface to be scanned by a scanning imaging optical system, forms a beam spot on the surface to be scanned and performs optical scanning of the surface to be scanned, is widely well-known in connection with a digital copier, an optical printer, a facsimile machine, and so fourth.

In such an optical scanning device, ideally, the surface to be scanned is scanned only by a proper scanning light. However, various optical components disposed from the light source to the surface to be scanned reflect light in some degree, and light thus reflected by these optical components and reaching the surface to be scanned acts as stray light against the proper scanning light.

Some stray light which generates a ghost image causing degradation in image quality of an image formed through the proper scanning light and is harmful is called 'ghost light'. Generally, a ghost image generated due to ghost light has a form in which a black stripe overlaps a proper image.

Respective optical components disposed on a light path extending from the light source to the surface to be scanned may generate ghost light.

In a first part of the light path extending from the light source to the light deflector, the light path of the beam is fixed. Accordingly, it is relatively easy to prevent ghost light from being generated, by adjusting the dispositions of the optical components properly.

However, in the second part of the light path extending from the light deflector to the surface to be scanned, the light path dynamically changes as a result the beam being deflected. Accordingly, ghost light may be easily generated from unexpected parts.

As the light deflector, one which reflects the beam from the light source by a deflection reflective surface which is rotated or swung is generally used. Such a light deflector is contained in a housing in order to avoid adherence of dust to a driving part or the deflection reflective surface of the light deflector, or to avoid leakage of machine noise or air flow noise therefrom, and, via a transparent parallel plate which covers a window formed in the housing, the beam is incident on the light deflector and exits from the housing, in many cases.

In such a case, light reflected by the transparent parallel plate covering the window of the housing may become ghost light. In order to prevent the ghost light in this case from adversely affecting proper image formation, the parallel plate is inclined so that the reflected light strays in a sub-scanning direction. However, thus-straying light may become secondary ghost light as a result of being reflected by a part of the scanning imaging optical system.

SUMMARY OF THE INVENTION

An object of the present invention is mainly to effectively reduce or prevent generation of ghost image due to reflection by a non-effective surface of the scanning imaging optical component such as a lens disposed between the light deflector and surface to be scanned in the optical scanning device.

A scanning imaging optical component used in an optical scanning device which deflects a beam from a light source by a light deflector, condenses the deflected beam toward a surface to be scanned by a scanning imaging optical system, forms a beam spot on the surface to be scanned, and performs optical scanning of the surface to be scanned, the optical component forming at least a part of the scanning imaging optical system; and at least a part of a surface of said optical component other than an effective optical surface is made to be a roughened surface, and roughness thereof is such that:

$$R\max > 0.5 \ (\mu m)$$

The scanning imaging optical component may comprise a lens, may comprise an imaging mirror having an imaging function, or may comprise a mirror having no imaging function.

The effective optical surface is lens surfaces or parts of the lens surfaces which participate formation of a beam spot, when the scanning imaging optical component is a lens. The effective optical surface is a mirror surface or a part of the mirror surface which participates formation of a beam spot, when the scanning imaging optical component is a mirror.

As mentioned above, the scanning imaging optical component is an optical system which forms at least a part of the scanning imaging optical system. Accordingly, the scanning imaging optical system may include only the scanning imaging optical component, for example. When the scanning imaging optical system includes only a single fθ lens, this fθ lens is the scanning imaging optical component, and at least a partial surface of the effective optical surfaces thereof is made to be the roughened surface.

Alternatively, when the scanning imaging optical system includes a plurality of lenses, each lens may be the scanning imaging optical component which has the roughened surface other than the effective optical surfaces thereof; or only one or some of the plurality of lenses may be the scanning imaging optical component which has the roughened surface other than the effective optical surfaces thereof and the other lenses may have no roughened surface.

The scanning imaging optical system may include a mirror having no imaging function (plane mirror for bending a light path) as the scanning imaging optical component. In this case, at least a part of the mirror surface thereof other than the effective optical surface may be made to be the roughened surface.

When a stray light other than a proper scanning beam is incident on the roughened surface of the scanning imaging optical component. the stray light reflected thereby is dispersed by the roughened surface. Accordingly, even it reaches the surface to be scanned, concentration of light intensity thereof is low. Therefore, even if it forms a latent image, the density thereof is low, and, when the latent image is visualized, no black stripe which problematically degrades a proper image results therefrom.

When the roughness Rmax of the roughened surface is not larger than 0.5 µm, dispersion of the stray light reflected thereby is not sufficient, and, thereby, this reflected light may still act as ghost light when reaching the surface to be scanned, and form a ghost image as a somewhat wide gray stripe.

The roughness of the roughened surface is preferably large in the view point of preventing generation of ghost image. However, when the scanning imaging optical component is formed through molding of plastic material, too large surface roughness Rmax thereof may result in difficulty of sliding of the product when it is separated from the mold. Therefore, in such a case, the roughness Rmax of the roughened surface of the scanning imaging optical component may be preferably such that Rmax<10 (µm).

When the scanning imaging optical component is formed of a glass, there is no such a problem for removing the product from a mold. Accordingly, the roughness Rmax may be on the order of 100 µm.

The light deflector of the optical scanning device according to the present invention may be a rotary mono-surface mirror, a rotary bi-surface mirror, a rotary polygon mirror, a galvano mirror, or the like, for example.

In a scanning optical system according to the present invention, the light deflector is contained in a housing;

a window is provided in said housing for causing the beam from the light source to be incident on the deflection reflective surface, and, also, causing the deflected beam reflected by the deflection reflective surface to exit from the housing;

a transparent parallel plate is provided for covering the window therewith; and the transparent parallel plate is inclined with respect to a direction perpendicular to a deflection scanning plane.

As the transparent parallel plate is thus inclined, a reflected beam which strays in the sub-scanning direction with respect to a proper scanning beam is generated as a stray light. However, although the stray light is incident on the scanning imaging optical component, when the roughened surface is provided at the thus-incident places the reflected beam is dispersed thereby, and is thus prevented from acting as ghost light. Accordingly, it is possible to effectively reduce or prevent generation of a ghost image.

A ghost image preventing method, according to the present invention, for preventing a reflected beam by a parallel plate from acting as ghost light in an optical scanning device, which deflects a beam from a light source by a light deflector having a deflection reflective surface rotating or swinging, condenses the deflected light toward a surface to be scanned by a scanning imaging optical system, forms a beam spot on the surface to be scanned and performs optical scanning of the surface to be scanned, wherein:

a transparent parallel plate covering a window provided in a housing containing the light deflector for causing the beam from the light source to be incident on the deflection reflective surface, and, also, causing the beam reflected by the deflection reflective surface to exit from the housing is inclined with respect to a direction perpendicular to a deflection scanning plane; and the scanning imaging optical system includes at least one rectangular lens, wherein relative positional relationship between respective lenses and the parallel plate is set such that the reflected beam by the parallel plate is prevented from being incident on a side-end surface of the rectangular lens in a sub-scanning direction.

Thereby, generation a of ghost image is prevented by preventing the reflected beam by the transparent parallel plate from being incident on and reflected by a surface other than the effective optical surface of the scanning imaging optical component of the scanning imaging optical system.

For this purpose, the optical configuration may be set such that the following formula holds:

$$H_1 < 4(l+m_1-\Delta_1)\theta \quad (1)$$

where:

'l' denotes a distance between a reflection position 'A' of the deflected beam by the deflection reflective surface and the parallel plate;

'θ' denotes an inclination angle of the parallel plate with respect to the direction perpendicular to the deflection scanning plane;

'$m_1$' denotes a distance between the lens surface nearest to the light deflector of the lenses included in the scanning imaging optical system and the reflection position A; and it is defined that '$\Delta_1 = -H_1^2/8R_1$' by a radius $R_1$ of curvature of the same lens surface; and a width $H_1$ along the sub-scanning direction of the same lens surface.

The sign of the above-mentioned radius of curvature is such that the sign is plus when the lens surface is a convex surface viewed from the light deflector. The same manner will be applied hereinafter.

When the optical configuration is set as mentioned above, the reflected beam by the parallel plate is caused to stray in the sub-scanning direction, but is not incident on the optical component of the scanning imaging optical system. Accordingly, no reflection of the stray light by the optical component occur.

The scanning imaging optical system may consist of N (>1) rectangular lenses;

wherein an optical configuration is set such that l, $m_i$, $m_{i+1}$, $H_i$, $H_{i+1}$, θ, $\Delta_i$ and $\Delta_{i+1}$ satisfy the following conditions:

$$H_{i+1} < 4(l+m_{i+1}-\Delta_{i+1})\theta \quad (2)$$

$$H_i > 4(l+m_i-\Delta_i)\theta \quad (3)$$

for any of I=1 through N−1, where:

'A' denotes a reflection position of the deflected beam by the deflection reflective surface;

'l' denotes a distance between 'A' and the parallel plate;

'θ' denotes an inclination angle of the parallel plate 4 with respect to the direction perpendicular to the deflection scanning plane;

'$m_i$' denotes a distance between a lens surface 2I on a surface-to-be-scanned side of an I-th (1≦I<N) lens from a light-deflector side of rectangular lenses of the scanning imaging optical system and 'A';

'$m_{i+1}$' denotes a distance between a lens surface 2I+1 on the light-deflector side of the (I+1)-th lens and 'A';

the following definition is made '$\Delta_i = -H_i^2/8R_i$' where:

'$R_i$' denotes a radius of curvature of the lens surface 2I; and

'$H_i$' denotes a width of the same lens surface along the sub-scanning direction; and the following definition is made '$\Delta_{i+1} = -H_{i+1}^2/8R_{i+1}$' where:

'$R_{i+1}$' denotes a radius of curvature of the lens surface 2I+1; and

'$H_{i+1}$' denotes a width along the sub-scanning direction of the same lens surface.

When an adhered lens is included in the scanning imaging optical system, the adhered lens is counted as one lens.

Thereby, the stray light reflected by the parallel plate is not incident on any side-end surface of the lenses in the sub-scanning direction of the plurality of lenses included in the scanning imaging optical system. Accordingly, there is no possibility that the stray light is reflected by any side-end surface of lenses, and becomes ghost light.

An image forming apparatus, according to the present invention, of performing optical scanning of a photosensitive surface of a photosensitive medium by an optical scanning device, forming a latent image, and visualizing the latent image, wherein the above-mentioned optical scanning device according to the present invention including the scanning imaging optical component according to the present invention is employed as the optical scanning device performing the optical scanning of the photosensitive surface of the photosensitive medium.

The photosensitive medium may comprise a photoconductive photosensitive body, the electrostatic latent image formed on the photosensitive surface through uniform charging and the optical scanning being visualized as a toner image.

In the above-mentioned image forming apparatus, the toner image may be fixed onto a sheet recording medium such as transfer paper, an OHP sheet (for an overhead projector), or the like.

As the photosensitive medium, a film for photography with silver halide may be used as the photosensitive medium, for example. In this case, the latent image formed through the optical scanning by the optical scanning device is visualized by a method of developing in an ordinary process of photography with silver halide. Such an image forming apparatus may be embodied as an optical plate-making system, or an optical drawing apparatus, for example.

The above-mentioned image forming apparatus according to the present invention may be applied to a laser printer, a laser plotter, a digital copier, a facsimile apparatus or the like.

Thus, according to the present invention, it is possible to render novel optical scanning device, scanning imaging optical system, scanning imaging optical component, optical scanning method, ghost image preventing method and image forming apparatus.

As the scanning imaging optical component according to the present invention has the roughened surface other than the effective optical surface, even a beam other than a proper scanning beam is incident on a surface other than the effective optical surface, it is dispersed, and, therefore, does not act as ghost light.

Further, in the ghost image preventing method according to the present invention, a beam other than a proper scanning beam is not incident on a side-end surface in a sub-scanning direction of a rectangular lens of the scanning imaging-optical system. Accordingly, no generation of ghost light due to reflection by the side-end surface occur.

Accordingly, in the scanning optical system or optical scanning device employing this scanning imaging optical component, or in the scanning optical system or optical scanning device rendering the above-mentioned ghost image preventing method, generation of ghost image is effectively reduced or prevented, and, as a result, satisfactory image formation can be rendered.

Other objects and further features of the present invention will become more apparent from the following detailed description when read in conjunction with the accompanying drawings.

DETAILED DESCRIPTION OF THE PREFERRED EMBODIMENTS

Figure 1A:
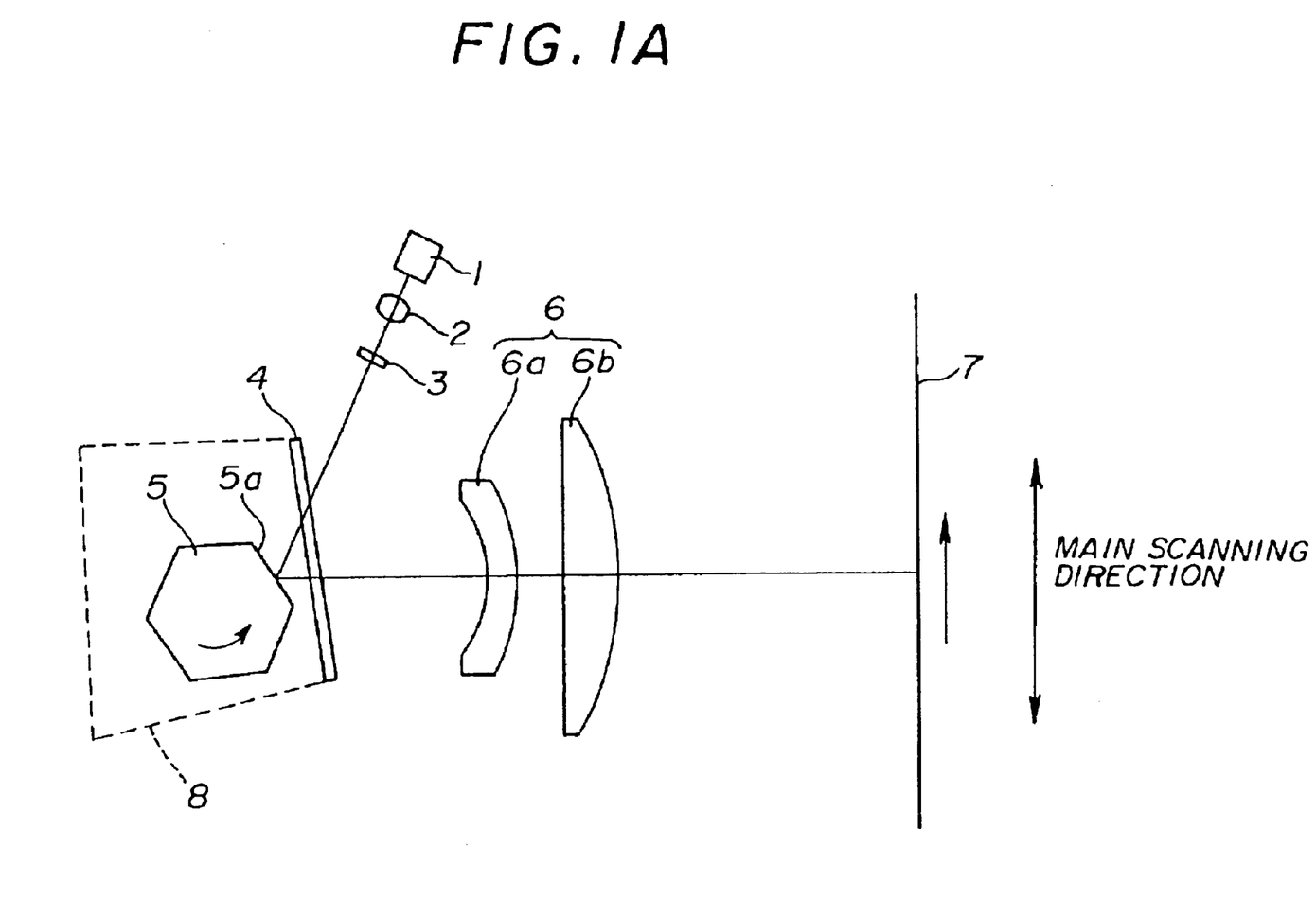
FIGS. 1A, 1B and 1C illustrate an embodiment of the present invention.

FIG. 1A shows a plan view of an optical scanning device in one embodiment of the present invention. This device includes a semiconductor laser 1 acting as a light source, a coupling lens 2 acting as a coupling optical system, a convex cylindrical lens 3 acting as a line-image imaging optical system, and a transparent parallel plate 4. Further, the device includes a rotary polygon mirror 5 acting as a light deflector, a scanning imaging optical system 6, a surface to be scanned 7 and a housing 8.

These components are assembled onto an optical scanning casing, not shown in the figure, so that these components are fixed in a predetermined mutual positional relationship.

The surface to be scanned 7 is, actually, a photosensitive surface of a photoconductive photosensitive medium such as a photosensitive body.

The housing 8 contains the rotary polygon mirror 5 so as to render dustproof and soundproof functions. The housing 8 has a window through which a beam from the light source 1 is incident onto a deflection reflective surface 5a of the rotary polygon mirror 5, and, also, a beam reflected by the deflection reflective surface 5a exits from the housing. The transparent parallel plate 4 is provided to cover this window. In the embodiment of the present invention, the transparent parallel plate 4 is a glass plate.

In the embodiment of the present invention, the scanning imaging optical system 6 includes two lenses 6a and 6b. These lenses 6a and 6b are rectangular lenses long in a main scanning direction. A divergent beam emitted by the semiconductor laser 1 is coupled to a subsequent optical system by the coupling lens 2. Specifically, a coupling function of the coupling lens 2 transforms the beam into a form suitable for the subsequent optical system. The thus-coupled beam may be a parallel beam, a divergent beam or a convergent beam, and, thus, the beam form is determined according to the optical characteristics of the optical systems disposed between the coupling lens 2 and the surface to be scanned 7.

The beam having passed through the coupling lens 2 is incident on the convex cylindrical lens 3. The cylindrical lens 3 has a positive power for a sub-scanning direction (a direction perpendicular to FIG. 1A), and condenses the incident beam along the sub-scanning direction. The thus-condensed beam is incident into the housing 8 through the parallel plate 4, and is imaged as a line image long along the main scanning direction on or in the vicinity of the deflection reflective surface 5a of the rotary polygon mirror 5. After being reflected by the deflection reflective surface 5a, the beam passes through the parallel plate 4 again while diverging along the sub-scanning direction, and is incident on the scanning imaging optical system 6.

The two lenses 6a, 6b of the scanning imaging optical system 6 form an anamorphic optical system such that the position of the deflection reflective surface 5a and the position of the surface to be scanned 7 (substantially) are made to have an geometrically optical conjugate relationship with one another with respect to the sub-scanning direction. The beam incident on the scanning imaging optical system 6 passes through the two lenses 6a, 6b in sequence, is condensed toward the surface to be scanned 7 by the function of the lenses 6a, 6b, and forms a beam spot on the surface to be scanned 7 therefrom.

When the rotary polygon mirror 5 rotates at a uniform velocity in a direction of an arrow shown in FIG. 1A, the reflected beam is deflected at a uniform angular velocity thereby, and optical scanning is performed by the beam spot formed on the surface to be scanned 7 in a direction shown in FIG. 1A. This optical scanning is main scanning, and, sub-scanning is performed as a result of the photosensitive surface functioning as the surface to be scanned 7 being moved in the sub-scanning direction simultaneously. Thus, writing of an image by main and sub-scanning is performed. and, thus, a latent image is formed on the surface to be scanned 7.

The scanning imaging optical system 6 consisting of the lenses 6a, 6b has a function of rendering uniform velocity such as fθ characteristics, and, thereby, makes the scanning speed of the beam spot uniform.

Figure 1B:
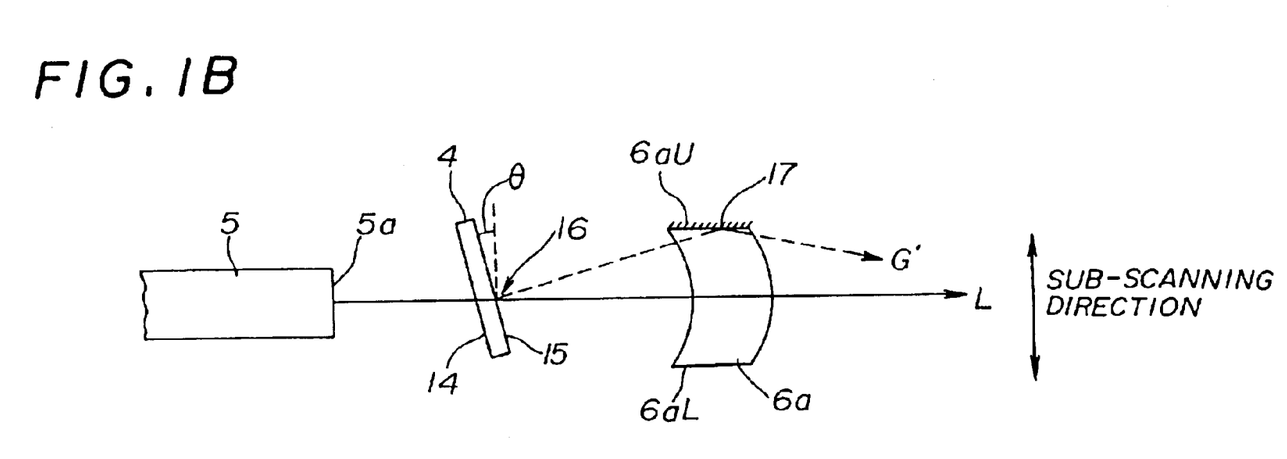

In FIG. 1B, a chief ray L of the deflected beam (proper scanning beam) obtained through ideal deflection by the deflection reflective surface 5a of the rotary polygon mirror 5 is shown. A plane traced by the chief ray moving by the deflection is the above-mentioned deflection scanning plane. The transparent parallel plate 4 is inclined by an angle θ from a direction perpendicular to the deflection scanning plane, as shown in FIG. 1B. This is because, if the angle θ=0, the beam incident on the parallel plate 4 from the light source and reflected by the outer surface 15 (located outside of the housing 8) of the parallel plate 4 would reach the surface to be scanned 7 through the scanning imaging optical system 6 so as to form a ghost image thereon, or a part of the beam reflected by the deflection reflective surface 5a would then be reflected by the inner surface 14 of the parallel plate 4, be then again reflected by the deflection reflective surface 5a, reach the surface to be scanned 7 through the scanning imaging optical system 6 so as to form a ghost image thereon.

Thus, by inclining the parallel plate 4, it is possible to prevent the reflected beam from the parallel plate 4 from acting as a primary ghost light. However, this does not completely avoid generation of ghost image.

For example, a case can be considered where, as shown in FIG. 1B, a beam (indicated by a broken line in the figure) reflected by the outer surface 15 of the parallel plate 4 is incident on a side-end surface 6aU of the lens 6a of the scanning imaging optical system 6 at the top thereof in the sub-scanning direction. In such a case, as long as the side-end surface 6aU of the lens 6a is smooth, the beam reflected by the side-end surface 6aU may cause a ghost image as a ghost light G'.

Figure 1C:
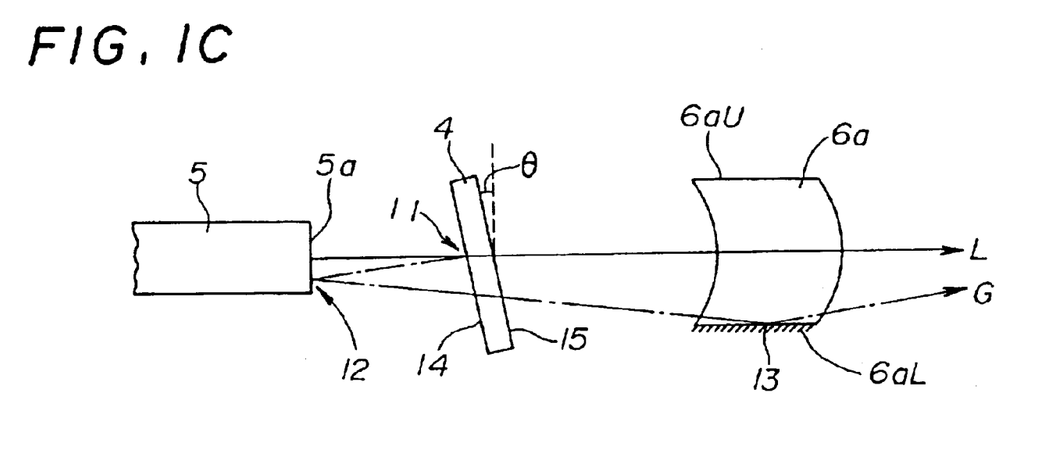

FIG. 1C shows a state where a part of the beam reflected by the deflection reflective surface 5a is then reflected by the inner surface 14 (at a position 11) of the parallel plate 4, as shown by a broken line, then, is again reflected by the deflection reflective surface 5a (at a position 12), and, then, becomes a ghost light G as a result of being reflected by a side-end surface 6aL of the lens 6a at the bottom in the sub-scanning direction.

In order to prevent the above-mentioned light G' from acting as a ghost light, the side-end surface 6aU of the lens 6a is made to be a roughened surface 17, as shown in FIG. 1B, and, the roughness Rmax thereof is made larger than 0.5 μm, or may be larger than 1 μm preferably. Similarly, in order to prevent the above-mentioned light G from acting as a ghost light, the side-end surface 6aL of the lens 6a is made to be a roughened surface 13, and, the roughness thereof Rmax is made larger than 0.5 μm, or larger than 1 μm preferably.

Accordingly, in order to prevent the light G and G' shown in FIGS. 1B and 1C from acting as ghost light, at least a partial surface 6aU and/or 6aL other than the effective optical surfaces of the optical component 6a (lens surfaces of the lens) which is at least a part of the scanning imaging optical system 6 is made to be a roughened surface, and the roughness thereof Rmax is such that Rmax>0.5 (μm), or Rmax>1 (μm) preferably.

With reference to FIGS. 1B and 1C, cases where ghost light is generated through reflection by the side-end surfaces in the sub-scanning directions of the lens 6a have been described. However, ghost light may also be generated through reflection by side-end surfaces in the sub-scanning directions of the lens 6b. In consideration of the deflected beam being the divergent beam for the sub-scanning direction, ghost light may be generated through reflection by side-end surfaces of the respective lenses 6a and 6b. Accordingly, in the case of the embodiment shown in FIG. 1A, it is preferable that respective side-end surfaces of the lenses 6a and 6b are made to be the roughened surfaces. It is obvious that these side-end surfaces are surfaces of the lenses other than the effective optical surfaces thereof.

Figure 2:
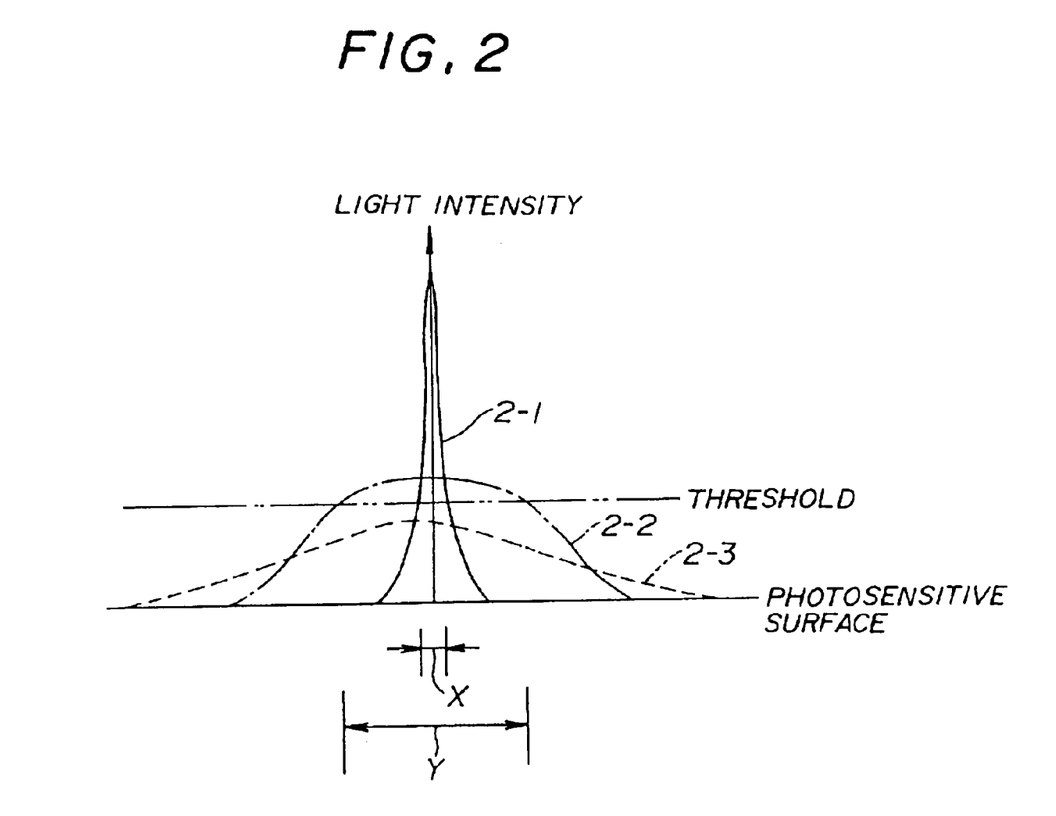
FIG. 2 illustrates effect in light dispersion by a roughened surface other than an effective optical surface of a scanning imaging optical component according to the present invention.

In FIG. 2, a horizontal axis represents the photosensitive surface of the photosensitive medium (assumed to be the photoconductive photosensitive body) which acts as the above-mentioned surface to be scanned 7, and a vertical axis represents a light intensity. THRESHOLD in FIG. 2 represents a threshold of photosensitivity of the surface to be scanned 7.

A curve 2-1 of FIG. 2 shows a distribution of light intensity formed on the photosensitive surface by the above-mentioned ghost light G, for example. In this case, because the light quantity of the ghost light G concentrates within a narrow range, an electric potential of a latent image formed thereby is high, and a clear black stripe having a width X is formed on the surface to be scanned 7. Accordingly, image quality of a proper image formed thereon is remarkably degraded thereby.

Curves 2-2 and 2-3 show distributions of light intensity formed on the photosensitive surface in respective cases where the surface by which the ghost light G is generated (side-end surface 6aL of the lens 6a) is made to be the roughened surface, and, thereby, the beam reflected by this surface is dispersed. In particular, the curve 2-3 shows the distribution of light intensity in the case where the roughness of the roughened surface is larger than the order of 1 μm, and, thereby, the dispersion is performed sufficiently thereby. In this case, the beam does not cause the photosensitive medium to be exposed thereby, and, thus, does not cause any ghost image to be generated thereon.

When the roughness of the roughened surface is on the order of 0.5 μm, the distribution of light intensity is such as the curve 2-2. In this case, the beam causes the photosensitive medium to be somewhat exposed. However, an electric potential of a thus-formed latent image is low, and a width Y of the latent image is large. Accordingly, a ghost image generated in this case is like a pale gray band having the width Y, and is not so conspicuous. Therefore, image quality of a proper image formed thereon overlappingly is not problematically degraded.

Formation of some reflection preventing films on the surfaces 14 and 15 of the parallel plate 4 is effective to reduce the light intensity of resulting ghost lights. However, it is difficult to prevent reflection thereby completely. In fact, approximately 4% reflection is unavoidable even when multi-layer reflection preventing films are formed. Accordingly, the reflection preventing films are not perfect countermeasures against ghost images. However, embodiments of the present invention may include use of such reflection preventing films.

Figures 3A, 3B:
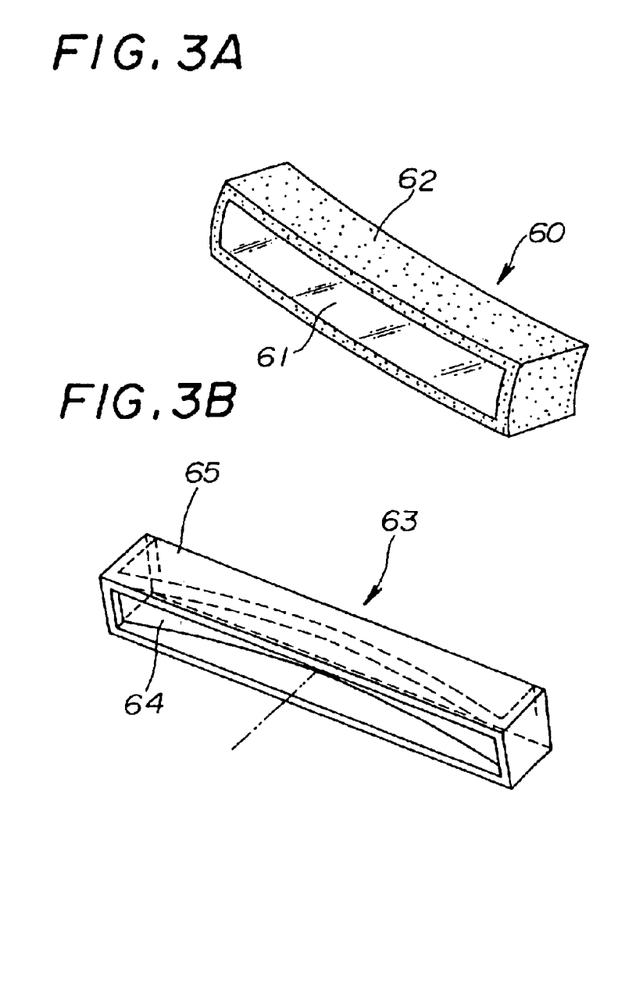
FIGS. 3A, 3B and 3C illustrates two examples of a scanning imaging optical component according to the present invention in a case where the scanning imaging optical component is a lens.

FIG. 3A shows an example of the above-mentioned lens 6a or 6b in which partial surfaces of a lens 60 other than the effective optical surfaces 61 are made to be the roughened surfaces. The surface roughness thereof is such that Rmax>0.5 ($\mu$m) as mentioned above.

A lens such as the lens 6b shown in FIG. 1A disposed near the surface to be scanned 7 has a longer dimension as the disposed position is nearer to the surface to be scanned. In fact, there is a long lens having a length longer than 200 mm. Such a lens is formed through molding of plastic material, and, a reinforcement holding frame is formed on the periphery of effective lens surfaces thereof integrally with a lens part by the plastic material.

A lens 63 shown in FIG. 3B is another example of such a long-dimension lens.

Figure 3C:
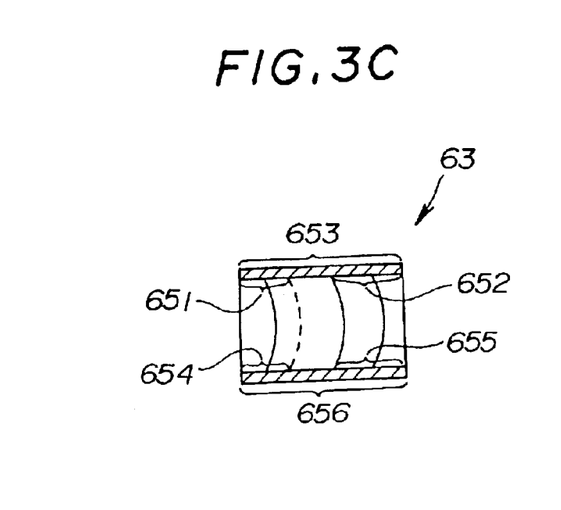

In FIG. 3B, the lens 63 has a lens-surface part 64, and a reinforcement-holding-frame part 65. In a case of such a lens having the reinforcement holding frame, such parts as those 651, 652, 635, 654, 655 and 656 of the reinforcement holding frame which may generate ghost light by reflecting a beam other than a proper scanning beam are made to be the roughened surfaces, as shown in FIG. 3C, and the roughness thereof is set larger than 0.5 $\mu$m, or may be larger than 1 $\mu$m preferably.

In the embodiment shown in FIG. 1A, a configuration was made such that the side-end surface 6aL of the lens 6a of the scanning imaging optical system 6 generates ghost light, and a ghost image formed therefrom was evaluated as the roughness Rmax of the above-mentioned side-end surface was changed. Then, the following results were obtained (experiment):

| Surface Roughness | Evaluation Result | |
| --- | --- | --- |
| 0.40 $\mu$m | D: | A black stripe clearly viewed by eyes was generated. |
| 0.48 $\mu$m | C: | A wide black stripe, pale but viewable together with a proper image, was generated |
| 0.52 $\mu$m | B: | A pale and almost inconspicuous band-like ghost image was generated. |
| 0.75 $\mu$m | A: | Substantially no ghost image was generated. |
| 1.00 $\mu$m | A: | No ghost image was generated at all. |

From this result, it is possible that, by setting the surface roughness Rmax of the roughened surfaces larger than 0.5 $\mu$m, generation of ghost image is substantially prevented, that is, a ghost image, even it is generated, is an inconspicuous one, and thus is not a problematic one.

As a surface roughness measuring apparatus for measuring the surface roughness, various type ones are known such as, for example, a stylus touching type one such as Form Tar Surface (フォームタリサーフ), Tari Step (タリステップ) (both trade names) or the like, made by Rank Tailor Hobson Co., Ltd. (ランク・テーラー ホブソン社), a interference meter type one such as ZYGO MAXIM (trade name) made by ZYGO Co., Ltd., an optical type one such as Surface Shape Measuring Microscope VF (表面形状測定顕微鏡 VF) (trade name) made by Keyence Co., Ltd.

In the above-mentioned experiment, the surface roughness Rmax was measured by the above-mentioned Surface Shape Measuring Microscope VF.

The above-mentioned lens 6a is an optical component 6a which is at least a part of the scanning imaging optical system 6 in the optical scanning device which deflects the beam from the light source 1 by the light deflector 5, condenses the thus-deflected beam toward the surface to be scanned 7 by the scanning imaging optical system 6, forms a beam spot on the surface to be scanned 7, and scans the surface to be scanned 7 by the beam spot optically, shown in FIG. 1A. Further, at least the partial surface 6aU or 6aL other than the effective optical surfaces of the optical component 6a is made to be the roughened surface 13 or 17, and the surface roughness Rmax thereof is such that Rmax>0.5 ($\mu$m). The optical component is made through molding of plastic material, and the above-mentioned roughened surfaces are formed as the molded surfaces. The optical component is a lens and has a rectangular shape long along the main scanning direction. Each or either of the two side-end surfaces 6aU and 6aL in the sub-scanning directions is formed as the roughened surface 13 and/or 17.

The lens 60 shown in FIG. 3A is one example of the above-mentioned optical component 6a of the scanning imaging optical system 6, and the partial surfaces other than the effective optical surfaces 61 thereof are made to be the roughened surfaces 62, and the roughness thereof is 0.5 $\mu$m.

The lens 63 shown in FIGS. 3B and 3C is another example of the above-mentioned optical component 6a of the scanning imaging optical system 6. The lens 63 is formed through molding of plastic material, the reinforcement holding frame 65 is formed integrally together with the lens part 64 by the plastic material outside of the effective lens surfaces thereof. At least a partial surface of the reinforcement holding frame 65 along the longitudinal direction of the lens is made to be the roughened surface.

The roughness Rmax of the roughened surface is preferably larger than 1.0 $\mu$m as discussed above. However, in a case where the lens is formed through molding of plastic material, it is preferable that the roughness Rmax is such that Rmax<10 ($\mu$m) in consideration of better sliding performance of the lens when it is separated from a mold.

In the above-discussed embodiment of the present invention, a scanning optical system is an optical system for directing the beam from the light source 1 to the surface to be scanned 7, forming the beam spot thereon, and scanning the surface to be scanned 7 by the beam spot, of the above-mentioned optical scanning device which deflects the beam from the light source 1 by the light deflector 5, condenses the thus-deflected beam toward the surface to be scanned 7 by the scanning imaging optical system 6, forms the beam spot on the surface to be scanned 7, and scans the surface to be scanned 7 by the beam spot, shown in FIG. 1A.

This scanning optical system includes the above-mentioned scanning imaging optical component 6a. The light deflector 5 is of a type such that the deflection reflective surface 5a is rotated, and, thereby, the reflected beam is deflected. The beam to be directed to the surface to be scanned 7 is a beam emitted from the semiconductor laser 1 as the light source, the coupling optical system 2 coupling the divergent beam from the light source to the subsequent optical system is provided. Further, the beam coupled by the coupling optical system 2 is used for imaging a line image long along the main scanning direction on or in the vicinity of the deflection reflective surface 5a of the light deflector 5 by the line-image imaging optical system 3.

Further, the scanning imaging optical system 6 is an anamorphic optical system such that, with respect to the sub-scanning direction, the position of the deflection reflective surface 5a and the position of the surface to be scanned 7 are made to (substantially) have a geometrically optical conjugate relationship therebetween, thereby.

Further, the coupling optical system 2 is a coupling lens, and the line-image imaging optical system 3 is a convex cylindrical lens.

The light deflector 5 is contained in the housing 8, the window is provided in the housing 8 such that the beam from the light source 1 is made incident on the deflection reflective surface 5a therethrough, and, also, the deflected beam reflected by the deflection reflective surface 5a is made exit from the housing therethrough. The parallel plate 4 is provided so as to cover the window therewith, and, is inclined with respect to the direction perpendicular to the above-mentioned deflection scanning plane.

By using the above-described optical scanning device including the above-mentioned scanning optical system, an optical scanning method of deflecting the beam from the light source 1 by the light deflector 5, condensing the thus-deflected beam toward the surface to be scanned 7 by the scanning imaging optical system 6, forming the beam spot on the surface to be scanned 7, and scanning the surface to be scanned 7 shown in FIG. 1A is performed.

A ghost image preventing method in one embodiment of the present invention will now be described.

An optical configuration of an optical scanning device for performing this ghost image preventing method is such as that shown in FIG. 1A.

The ghost image preventing method, which will now be described, is a method of preventing the reflected beam shown in FIG. 1C, that is, the part of the deflected beam reflected by the inner surface 14 (at the position 11) of the parallel plate 4 from returning to the deflection reflective surface 5a, then being reflected thereby so as to become a ghost light.

Figure 4:
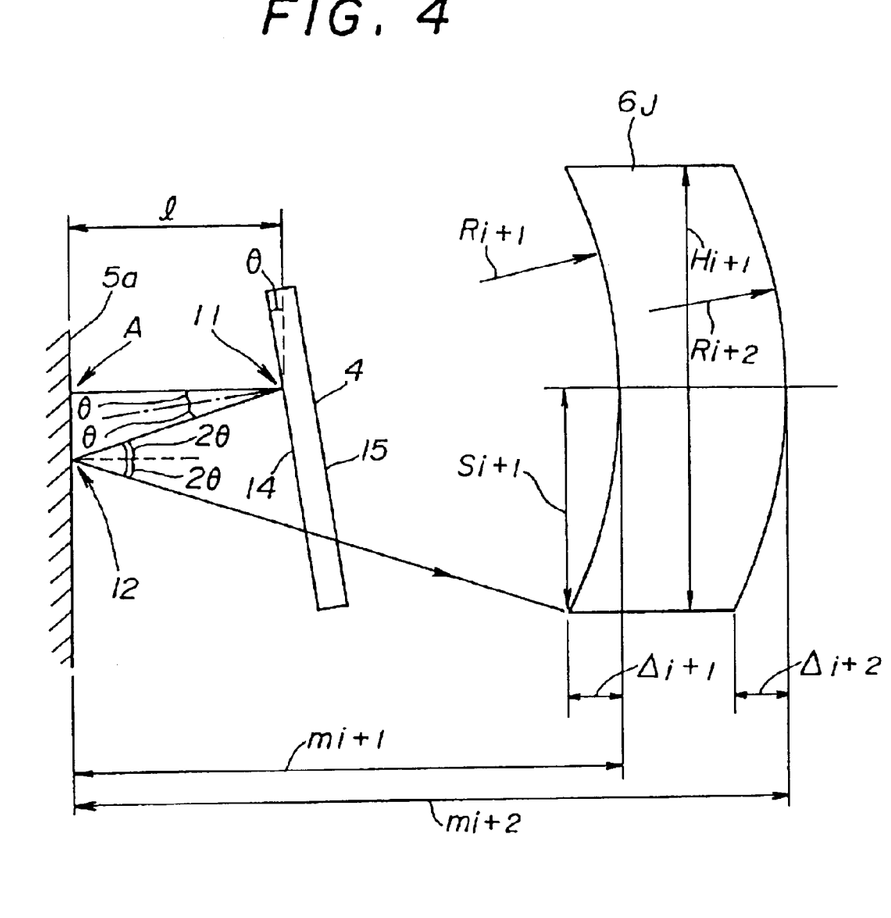
FIGS. 4 and 5 illustrate a ghost image preventing method according to the present invention.

In FIG. 4, the above-mentioned deflection reflective surface 5a, parallel plate 4, inner surface 14 of the parallel plate 4 facing inward (of the housing 8), and outer surface 15 of the parallel plate 4 facing outward (of the housing) are shown. A lens 6J is either one of the above-mentioned lenses 6a and 6b. A surface of the lens 6J on a beam incident side is referred to as an 'i+1 surface', and the radius of curvature thereof is referred to as $R_{i+1}$. When the lens 6J is the lens 6a, i=0. When the lens 6J is the lens 6b, i=2.

In FIG. 4, a position of the deflection reflective surface 5a at which the beam (proper scanning beam) is incident from the light source 1 on the deflection reflective surface 5a and reflected thereby is referred to as 'A'. A distance (along a direction parallel to the optical axis of the scanning imaging optical system 6) between this reflection position A and the inner surface 14 (at the position 11) of the parallel plate 4 is referred to as 'l'. An angle of the parallel plate 4 with respect to the direction perpendicular to the above-mentioned deflection scanning plane is referred to as 'θ', and a lens width along the sub-scanning direction of the i+1 surface is referred to as '$H_{i+1}$'.

Further, the distance between the deflection reflective surface 5a and the i+1 surface is referred to as '$m_{i+1}$' as shown in FIG. 4, and a distance between the optical axis of the lens 6J and a lens end thereof is referred to as '$S_{i+1}$ $(=H_{i+1}/2)$'.

The part of the proper scanning beam, which is the beam reflected by the inner surface 14 of the parallel plate 4 at the position 11, is then reflected by the deflection reflective surface 5a at the position 12, as shown in FIG. 4. At this time, the reflection angle is 2θ. A condition for the beam reflected by the reflection angle 2θ to reach an end of the i+1 surface of the 6J as shown in FIG. 4 is such that $$(l+m_{i+1}-\Delta_{i+1})\cdot 2\theta = S_{i+1}(=H_{i+1}/2)$$

In this formula, '$\Delta_{i+1}$' is expressed by the following formula using the radius of curvature $R_{i+1}$:

$$\Delta_{i+1}=(-S_{i+1}^2)/2R_{i+1}=-H_{i+1}^2/8R_{i+1}$$

Accordingly, when the width $H_{i+1}$ along the sub-scanning direction of the lens 6J satisfies the following condition:

$$H_{i+1}<4(l+m_{i+1}-\Delta_{i+1})\cdot\theta \quad (A)$$

the above-mentioned reflected beam is not incident on the i+1 surface of the lens 6J, and thus strays from the i+1 surface. Therefore, this beam is not reflected by the side-end surface of the lens 6J, and thus, does not become ghost light.

A lens surface 'i+2 surface' which is a lens surface on a beam exit side of the lens 6J will now be considered. Assuming the distance between the deflection reflective surface 5a and the i+2 surface as $m_{i+2}$, and the radius of curvature of the i+2 surface as $R_{i+2}$, when the width $H_{i+2}$ (in this case, equal to $H_{i+1}$) along the sub-scanning direction of the lens 6J satisfies the following condition:

$$H_{i+2}>4(l+m_{i+2}-\Delta_{i+2})\cdot\theta \quad (B)$$

where $\Delta_{i+2}$ shown in FIG. 4 is '$-H_{i+2}^2/8R_{i+2}$', the re-reflected beam by the deflection reflective surface 5a is not incident on the side-end surface of the lens 6J, thus, does not become ghost light, and passes through the lens 6J.

Figure 5:
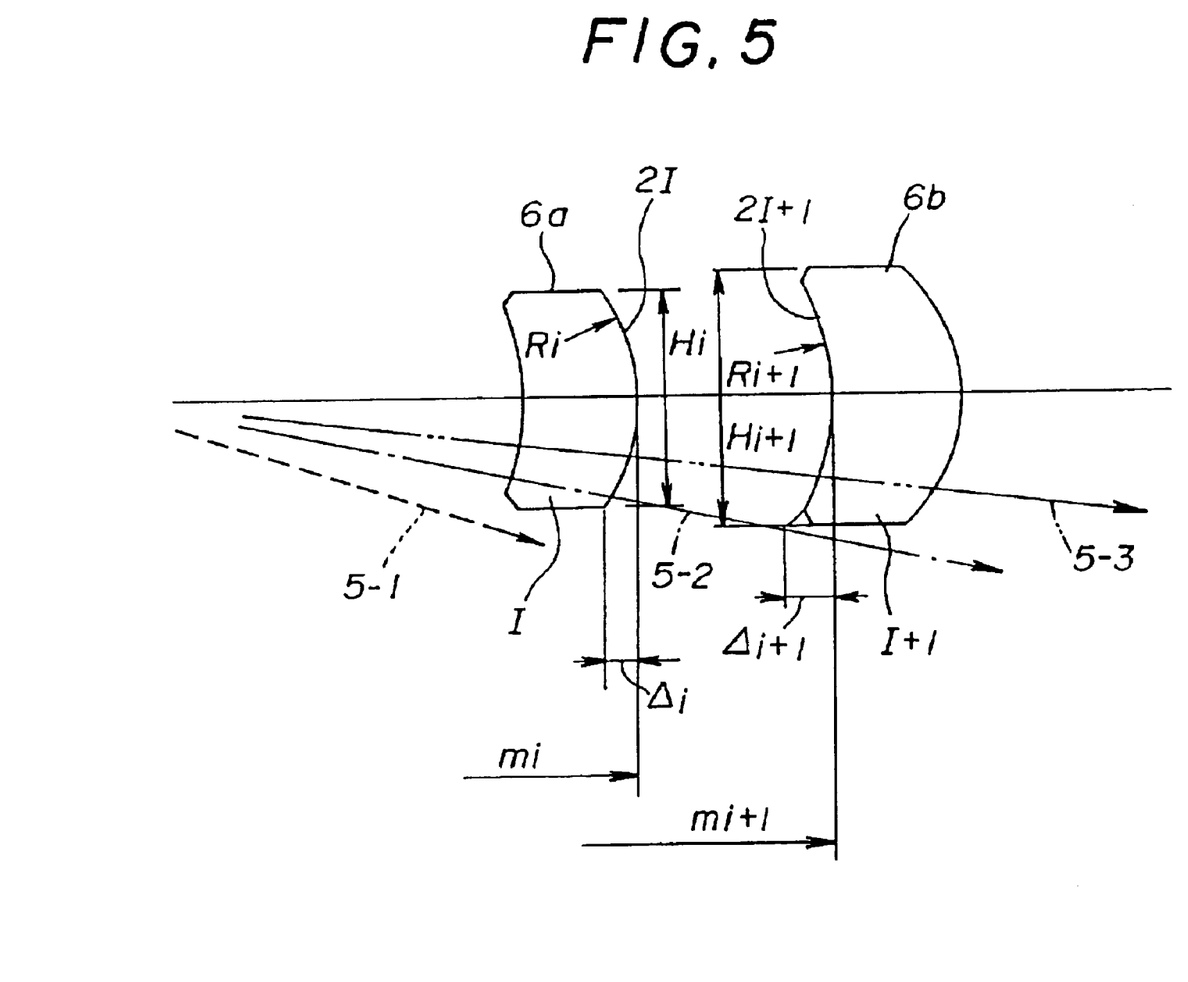

When the above description is applied to the above-mentioned lenses 6a and 6b, the configuration shown in FIG. 5 is obtained.

Specifically, when the lens 6J shown in FIG. 4 is the lens 6a shown in FIG. 5, the reflected beam satisfying the above-mentioned condition (A) is a beam 5-1, and the reflected beam satisfying the condition (B) is a beam 5-2.

When the lens 6J is the lens 6b shown in FIG. 5, the reflected beam satisfying the above-mentioned condition (A) is a beam 5-2, and the reflected beam satisfying the condition (B) is a beam 5-3.

The above description will now be generalized into a case where the scanning imaging optical system includes of N (>1) rectangular lenses:

First, the following reference is made: A reflection position of the deflected beam by the deflection reflective surface 5a is referred to as 'A'; a distance between above-mentioned reflection position A and the parallel plate 4 is referred to as 'l'; an inclination angle of the parallel plate 4 with respect to the direction perpendicular to the above-mentioned deflection scanning plane is referred to as 'θ'; a distance between a lens surface 2I on a surface-to-be-scanned side of an I-th (1≦I<N) lens from a light-deflector side of rectangular lenses included in the scanning imaging optical system and the above-mentioned reflection position A is '$m_i$'; and a distance between a lens surface 2I+1 on the light-deflector side of the (I+1)-th lens and the above-mentioned reflection position A is '$m_{i+1}$'.

Further, the following definition is made: '$\Delta_i = -H_i^2/8R_i$', where '$R_i$' denotes a radius of curvature of the lens surface 2I; and '$H_i$' denotes a width of the same lens surface along the sub-scanning direction. Further, the following definition is made '$\Delta_{i+1} = -H_{i+1}^2/8R_{i+1}$' where '$R_{i+1}$' denotes a radius of curvature of the lens surface 2I+1; and '$H_{i+1}$' denotes a width along the sub-scanning direction of the same lens surface. Then, when an optical configuration is set such that l, $m_i$, $m_{i+1}$, $H_i$, $H_{i+1}$, θ, $\Delta_i$ and $\Delta_{i+1}$ satisfy the following conditions:

$$H_{i+1} < 4(l + m_{i+1} - \Delta_{i+1})\theta \quad (2)$$

$$H_i > 4(l + m_i - \Delta_i)\theta \quad (3)$$

for any of I=1 through N−1, the above-mentioned reflected beam is not reflected by any side-end surface of the lenses of the scanning imaging optical system, and thus, does not become ghost light.

In the case shown in FIG. 5, there is a no case where the beam 5-3 becomes ghost light as a result of being reflected by the side-end surface. However, there is a possibility that it directly reaches the surface to be scanned, and forms a ghost image thereon. In order to prevent such a situation, some arrangement should be made such as to prevent this beam from reaching the surface to be scanned.

When the above-mentioned condition (3) is applied to the lens surface nearest to the light deflector of the lenses of the scanning imaging optical system, the relevant beam is the beam 5-1 shown in FIG. 5, and is not incident on the scanning imaging optical system. This case can be described as follows:

It is assumed that: a distance between a reflection position 'A' of the deflected beam by the deflection reflective surface and the parallel plate is 'l'; an inclination angle of the parallel plate with respect to the direction perpendicular to the above-mentioned deflection scanning plane is 'θ'; and a distance between the lens surface nearest to the light deflector of the lenses included in the scanning imaging optical system and the reflection position A is $m_1$. Then, it is defined that '$\Delta_1 = -H_1^2/8R_1$' by a radius $R_1$ of curvature of the same lens surface; and a width $H_1$ along the sub-scanning direction of the same lens surface. Then, an optical configuration is set such that l, $m_1$, $H_1$, θ, $\Delta_1$ satisfy the following condition:

$$H_1 < 4(l + m_1 - \Delta_1)\theta \quad (1)$$

Thus, the above-described ghost image preventing method is a method of preventing the reflected beam by the parallel plate 4 from acting as ghost light in the optical scanning device which deflects the beam from the light source by the light deflector having the deflection reflective surface 5a rotating or swinging, condenses the deflected light toward the surface to be scanned 7 by the scanning imaging optical system 6, forms the beam spot on the surface to be scanned 7, and performs optical scanning of the surface to be scanned 7 by the beam spot, wherein the transparent parallel plate 4 covering the window provided in the housing 8 for causing the beam from the light source to be incident on the deflection reflective surface 5a, and, also, causing the beam reflected by the deflection reflective surface 5a to exit from the housing 8 is inclined with respect to the direction perpendicular to the deflection scanning plane; and the scanning imaging optical system includes at least one rectangular lens. In this method, mutual positional relationship between each lens and parallel plate is set such that the reflected beam by the parallel plate 4 is prevented from being incident on the side-end surface in the sub-scanning direction of the rectangular lens.

This setting of optical configuration can be achieved by, generally, the angle θ of the parallel plate 4 is adjusted.

Accordingly, a scanning optical system for performing the above-discussed ghost image preventing method in an optical scanning device having an optical configuration such as that shown in FIG. 1A is the optical scanning device which deflects the beam from the light source by the light deflector having the deflection reflective surface 5a rotating or swinging, condenses the deflected light toward the surface to be scanned 7 by the scanning imaging optical system 6, forms the beam spot on the surface to be scanned 7, and performs optical scanning of the surface to be scanned 7 by the beam spot, wherein the transparent parallel plate 4 covering the window provided in the housing 8 for causing the beam from the light source to be incident on the deflection reflective surface 5a, and, also, causing the beam reflected by the deflection reflective surface 5a to exit from the housing 8 is inclined with respect to the direction perpendicular to the deflection scanning plane; and the scanning imaging optical system includes at least one rectangular lens.

This scanning optical system is an optical system for directing the beam from the light source 1 to the surface to be scanned 7, forming the beam spot thereon, and scanning the surface to be scanned 7 by the beam spot. This scanning optical system is configured such that the reflected beam by the parallel plate 4 is prevented from acting as ghost light in accordance with the above-mentioned ghost image preventing method.

This scanning optical system includes the above-mentioned scanning imaging optical component 6a. The light deflector 5 is of a type such that the deflection reflective surface 5a is rotated, and, thereby, the reflected beam is deflected. The beam to be directed to the surface to be scanned 7 is the beam emitted from the semiconductor laser 1 as the light source, the coupling optical system 2 coupling the divergent beam from the light source to the subsequent optical system is provided.

Further, the beam coupled by the coupling optical system 2 is used for imaging a line image long along the main scanning direction on or in the vicinity of the deflection reflective surface 5a of the light deflector 5 by the line-image imaging optical system 3. Further, the scanning imaging optical system 6 is an anamorphic optical system such that, with respect to the sub-scanning direction, the position of the deflection reflective surface and the position of the surface to be scanned are made to (substantially) have a geometrically optical conjugate relationship therebetween, thereby. Further, the coupling optical system 2 is a coupling lens, and the line-image imaging optical system 3 is a convex cylindrical lens.

In the above-mentioned conditional formula (1), when '$H_i$' is replaced by a width of a mirror surface along the sub-scanning direction of a mirror, the condition (1) may also be used as a condition of preventing ghost light from being generated through reflection by the imaging mirror in a case where the deflected light is used for imaging on the surface to be scanned as a result of being reflected by the imaging mirror.

Further, in the above-mentioned conditional formulas (2) and (3), when l=0, and $m_i$, $m_{i+1}$ are read as distances from the outer surface of the parallel plate 4 to the 2I surface and 2I+1 surface, respectively, these conditions may be used as conditions for preventing the reflected light by the outer surface 15 of the parallel plate 4 from being reflected by the side-end surface of lens and becoming ghost light.

The beams 5-1, 5-2, 5-3, and so forth shown in FIG. 5 are not incident on the side-end surfaces of lenses, and, are incident on the surface of the optical scanning casing to which the optical systems are assembled. The surface of the casing is a generally roughened surface and disperses incident beams. Accordingly, this surface does not generate any ghost lights.

Figure 6:
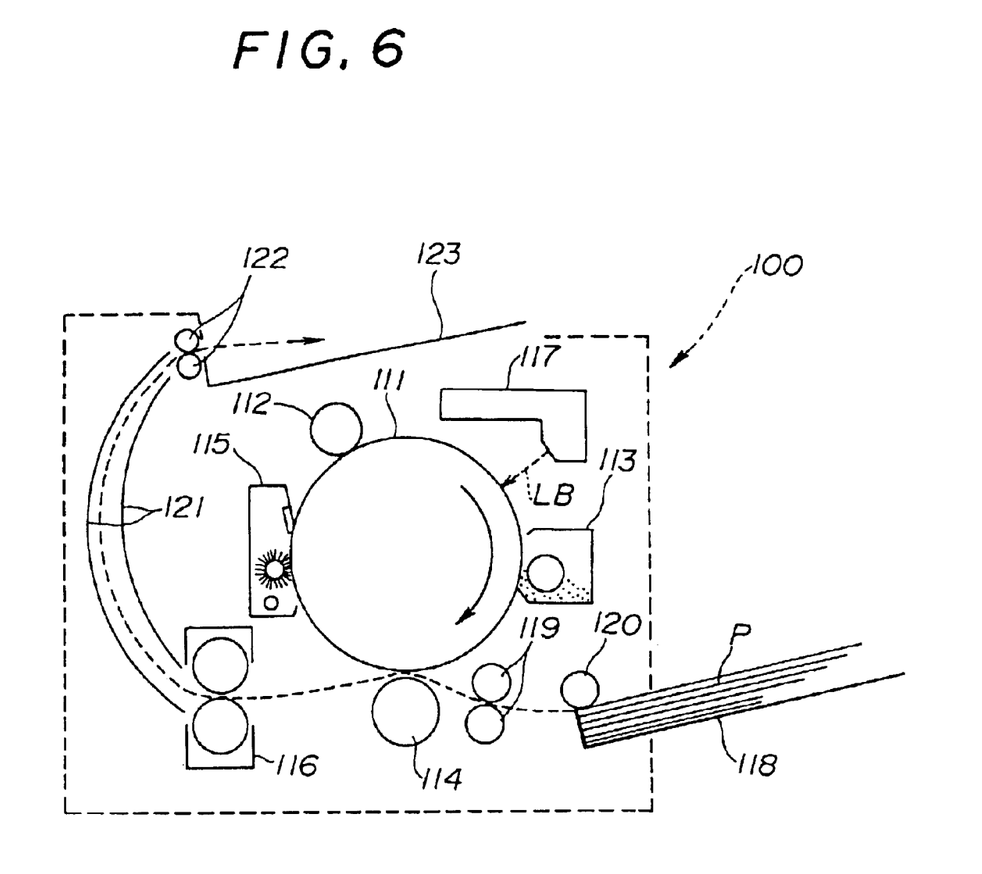
FIG. 6 illustrates an image forming apparatus in one embodiment of the present invention.

With reference to FIG. 6, an image forming apparatus in one embodiment of the present invention will now be described.

The image forming apparatus shown in FIG. 6 is a laser printer.

This laser printer 100 has a cylindrical photoconductive photosensitive body acting as a photosensitive medium 111. In the periphery of the photosensitive medium 111, a charging roller 112 acting as a charging unit, a developing device 113, a transfer roller 114, and a cleaning device 115 are disposed. It is also possible to use a well-known corona charger as the charging unit.

Further, an optical scanning device 117 using a laser beam LB is provided, and performs exposure through optical writing between the charging roller 112 and developing device 113.

As shown in FIG. 6, a fixing device 116, a cassette 118, a pair of registration rollers 119, a paper feeding roller 120, a conveying path 121, a pair of paper ejecting rollers 122, and a tray 123 are also provided. Transfer paper P is used as a sheet recording medium.

When image forming is performed, the photosensitive medium 111 is rotated clockwise at a uniform velocity, the surface thereof is charged uniformly by the charging roller 112, and an electrostatic latent image is formed on the surface of the photosensitive medium 111 through exposure by optical writing with the laser beam LB of the optical scanning device 117. The thus-formed electrostatic latent image is a so-called negative latent image having an image part exposed thereby.

This electrostatic latent image is developed inversely by the developing device 113, and, thus, a toner image is formed on the photosensitive medium 111.

The cassette 118 containing the transfer paper P is detachable from/to the body of the image forming apparatus 100. In the state in which the cassette 118 is loaded as shown in the figure, the top one sheet of the transfer paper P is fed by the paper feeding roller 120. The thus-fed transfer paper P is nipped by the pair of registration rollers 119 at the top of the paper P. The pair of registration rollers 119 feeds the transfer paper P to a transfer position of the photosensitive medium 111 at the time at which the toner image is moved to the transfer position. The fed transfer paper P is laid onto the toner image at the transfer position, and, by the function of the transfer roller 114, the toner image is transferred to the transfer paper P electrostatically.

The transfer paper P thus having had the toner image transferred thereto is sent to the fixing device 116, which fixes the toner image onto the transfer paper P. Then, the transfer paper P passes through the conveying path 121, and is ejected to the tray 123 by the pair of ejecting rollers 122. The surface of the photosensitive medium 111 is then cleaned by the cleaning device 115, and, thus, remaining toner, paper powder and so forth are removed therefrom.

It is also possible to use an OHP sheet instead of the above-mentioned transfer paper. A provision may be made such that the transfer of the toner image is performed via an intermediate transfer medium such as an intermediate transfer belt or the like. By employing the optical scanning device including the scanning imaging optical system such as that shown in FIG. 1A in the embodiment of the present invention as the optical scanning device 117, it is possible to render satisfactory image forming.

The present invention is not limited to the above-described embodiments, and variations and modifications may be made without departing from the scope of the present invention.

The present application is based on Japanese priority application No. 2000-080521, filed on Mar. 22, 2000, the entire contents of which are hereby incorporated by reference.

What is claimed is:

1. A ghost image preventing method for preventing a reflected beam from acting as ghost light in an optical scanning device, comprising:

deflecting a beam from a light source by a light deflector having a deflection reflective surface rotating or swinging;

condensing the deflected light toward a surface to be scanned by a scanning imaging optical system;

forming a beam spot on the surface to be scanned; and performing optical scanning of the surface to be scanned, wherein a transparent parallel plate closing a window provided in a housing containing the light deflector for causing the beam from the light source to be incident on the deflection reflective surface, and causing the beam reflected by the deflection reflective surface to exit from the housing is inclined with respect to a direction perpendicular to a deflection scanning plane, the scanning imaging optical system includes at least one rectangular lens, and a relative positional relationship between said at least one rectangular lens and the parallel plate is set such that the beam reflected by the parallel plate is prevented from being incident on a side-end surface in a sub-scanning direction of the at least one rectangular lens.

2. The method as claimed in claim 1, wherein an optical configuration is set such that the following formula holds:

$$H_1 < 4(l+m_1-\Delta_1)\theta \qquad (1)$$

where:

'l' denotes a distance between a reflection position 'A' of the deflected beam by the deflection reflective surface and the parallel plate;

'θ' denotes an inclination angle of the parallel plate with respect to the direction perpendicular to the deflection scanning plane;

'$m_1$' denotes a distance between a lens surface nearest to the light deflector of lenses included in the scanning imaging optical system and the reflection position A; and $\Delta_1 = -H_1^2/8R_1$ where $R_1$ is a radius of curvature of the lens surface and $H_1$ is a width along the sub-scanning direction of the lens surface.

3. The method as claimed in claim 1, wherein the scanning imaging optical system comprises N (>1) rectangular lenses; and wherein an optical configuration is set such that l, $m_i$, $m_{i+1}$, $H_i$, $H_{i+1}$, θ, $\Delta_i$ and $\Delta_{i+1}$ satisfy the following conditions:

$$H_{i+1} < 4(l+m_{i+1}-\Delta_{i+1})\theta \quad (2)$$

$$H_1 > 4(l+m_i-\Delta_i)\theta \quad (3)$$

for any of I=1 through N−1, where:

'A' denotes a reflection position of the deflected beam by the deflection reflective surface;

'l' denotes a distance between the reflection position A and the parallel plate;

'θ' denotes an inclination angle of the parallel plate with respect to the direction perpendicular to the deflection scanning plane;

'$m_i$' denotes a distance between a lens surface 2I on a surface-to-be-scanned side of an I-th (1≦I<N) lens from a light-deflector side of rectangular lenses of the scanning imaging optical system and the reflection position A; and '$m_{i+1}$' denotes a distance between a lens surface 2I+1 on the light-deflector side of the (1+1)-th lens and the reflection position A;

$\Delta_i = -H_i^2/8R_i$ where:

'$R_i$' denotes a radius of curvature of the lens surface 2I; and

'$H_i$' denotes a width along the sub-scanning direction of the I-th lens surface; and $\Delta_{i+1} = -H_{i+1}^2/8R_{i+1}$ where:

'$R_{i+1}$' denotes a radius of curvature of the lens surface 2I+1; and

'$H_{i+1}$' denotes a width along the sub-scanning direction of (I+1)-th lens surface.

4. A ghost image preventing method for preventing a reflected beam from acting as ghost light in an optical scanning device, comprising:

deflecting a beam from light source means by light deflecting means having a deflection reflective surface rotating or swinging;

condensing the deflected light toward a surface to be scanned by scanning imaging optical means;

forming a beam spot on the surface to be scanned; and performing optical scanning of the surface to be scanned, wherein a transparent parallel plate covering a window provided in a housing containing the light deflecting means for causing the beam from the light source means to be incident on the deflection reflective surface, and causing the beam reflected by the deflection reflective surface to exit from the housing is inclined with respect to a direction perpendicular to a deflection scanning plane, the scanning imaging optical means includes at least one rectangular lens, and a relative positional relationship between said at least one rectangular lens and the parallel plate is set such that the beam reflected by the parallel plate is prevented from being incident on a side-end surface in a sub-scanning direction of the at least one rectangular lens.

5. A scanning optical system of an optical scanning device which deflects a beam, comprising:

a light source;

a light deflector having a deflection reflective surface rotating or swinging and configured to deflect light and condense the deflected light toward a surface to be scanned, to form a beam spot on the surface to be scanned and to perform optical scanning of the surface to be scanned;

a scanning imaging optical system configured to scan the surface to be scanned;

a transparent parallel plate covering a window provided in a housing containing the light deflector for causing the beam from the light source to be incident on the deflection reflective surface, and causing the beam reflected by the deflection reflective surface to exit from the housing is inclined with respect to a direction perpendicular to a deflection scanning plane; and the scanning imaging optical system includes at least one rectangular lens, wherein said scanning optical system directs the beam from the light source to the surface to be scanned, forms the beam spot on the surface to be scanned, and scans the surface to be scanned by the beam spot, and wherein a relative positional relationship between said at least one rectangular lens and the parallel plate is set such that the beam reflected by the parallel plate is prevented from being incident on a side-end surface in a sub-scanning direction of the at least one rectangular lens.

6. The scanning optical system as claimed in claim 5, wherein:

the beam to be directed onto the surface to be scanned is a beam emitted by a semiconductor laser as the light source; and a coupling optical system is provided for coupling a divergent beam from the light source to a subsequent optical system.

7. The scanning optical system as claimed in claim 6, wherein:

a line-image imaging optical system is provided for imaging a line image long along a main scanning direction on or in the vicinity of the deflection reflective surface of the light deflector, from the beam coupled by the coupling optical system; and the scanning imaging optical system comprises an anamorphic optical system such that, with respect to the sub-scanning direction, a position of the deflection reflective surface and a position of the surface to be scanned are made to have a geometrically optical conjugate relationship therebetween, thereby.

8. The scanning optical system as claimed in claim 7, wherein:

said coupling optical system comprises a coupling lens; and said line-image imaging optical system comprises a convex cylindrical lens.

9. An optical scanning device which deflects a beam, comprising:

a light source;

light deflecting means having a deflection reflective surface rotating or swinging for deflecting light and condensing the deflected light toward a surface to be scanned, for forming a beam spot on the surface to be scanned and for performing optical scanning of the surface to be scanned;

scanning imaging optical means for scanning the surface to be scanned;

a transparent parallel plate covering a window provided in a housing containing the light deflecting means for causing the beam from the light source to be incident on the deflection reflective surface, and causing the beam reflected by the deflection reflective surface to exit from the housing is inclined with respect to a direction perpendicular to a deflection scanning plane; and the scanning imaging optical means includes at least one rectangular lens, wherein the scanning optical system as claimed in claim 5 is employed as a scanning optical system which directs the beam from the light source to the surface to be scanned.

10. An image forming apparatus of performing optical scanning of a photosensitive surface of a photosensitive medium by an optical scanning device, forming a latent image, and visualizing the latent image, wherein the optical scanning device as claimed in claim 9 is employed as the optical scanning device performing the optical scanning of the photosensitive surface of the photosensitive medium.

11. The apparatus as claimed in claim 10, wherein said photosensitive medium comprises a photoconductive photosensitive body, an electrostatic latent image formed on said photosensitive surface through uniform charging and the optical scanning being visualized as a toner image.

12. A scanning optical system of an optical scanning device which deflects a beam, comprising:

a light source;

light deflecting means having a deflection reflective surface rotating or swinging for deflecting light and condensing the deflected light toward a surface to be scanned, for forming a beam spot on the surface to be scanned and for performing optical scanning of the surface to be scanned;

scanning imaging optical means for scanning the surface to be scanned;

a transparent parallel plate covering a window provided in a housing containing the light deflecting means for causing the beam from the light source to be incident on the deflection reflective surface, and causing the beam reflected by the deflection reflective surface to exit from the housing is inclined with respect to a direction perpendicular to a deflection scanning plane; and the scanning imaging optical means includes at least one rectangular lens, wherein said scanning optical system directs the beam from the light source to the surface to be scanned, forms the beam spot on the surface to be scanned, and scans the surface to be scanned by the beam spot, and wherein a relative positional relationship between said at least one rectangular lens and the parallel plate is set such that the beam reflected by the parallel plate is prevented from being incident on a side-end surface in a sub-scanning direction of the at least one rectangular lens.

13. An optical scanning device which deflects a beam, comprising:

a light source;

light deflecting means having a deflection reflective surface rotating or swinging for deflecting light and condensing the deflected light toward a surface to be scanned, for forming a beam spot on the surface to be scanned and for performing optical scanning of the surface to be scanned;

scanning imaging optical means for scanning the surface to be scanned;

a transparent parallel plate covering a window provided in a housing containing the light deflecting means for causing the beam from the light source to be incident on the deflection reflective surface, and causing the beam reflected by the deflection reflective surface to exit from the housing is inclined with respect to a direction perpendicular to a deflection scanning plane; and the scanning imaging optical means includes at least one rectangular lens, wherein the scanning optical system as claimed in claim 12 is employed as a scanning optical system which directs the beam from the light source to the surface to be scanned.

14. An image forming apparatus of performing optical scanning of a photosensitive surface of a photosensitive medium by an optical scanning device, forming a latent image, and visualizing the latent image, wherein the optical scanning device as claimed in claim 13 is employed as the optical scanning device performing the optical scanning of the photosensitive surface of the photosensitive medium.

15. The apparatus as claimed in claim 14, wherein said photosensitive medium comprises a photoconductive photosensitive body, an electrostatic latent image formed on said photosensitive surface through uniform charging and the optical scanning being visualized as a toner image.

* * * * *